United States Patent Office 3,341,324
Patented Sept. 12, 1967

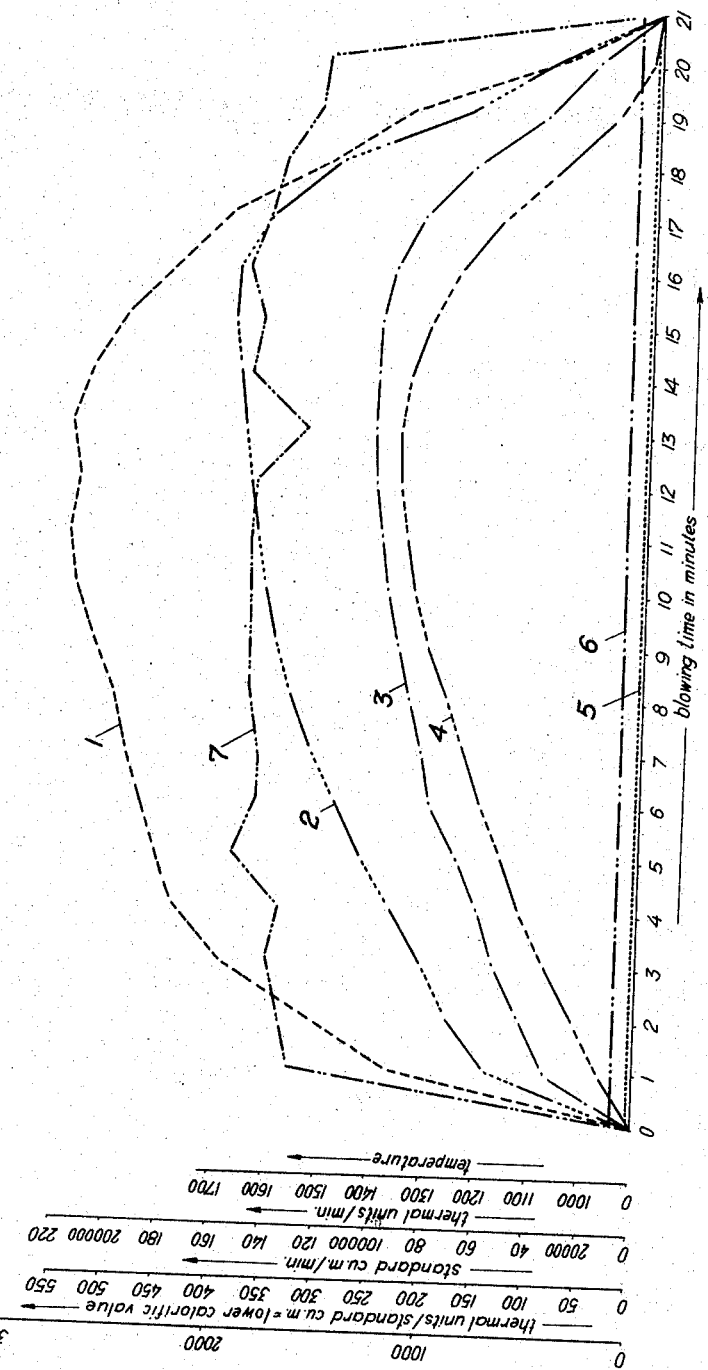

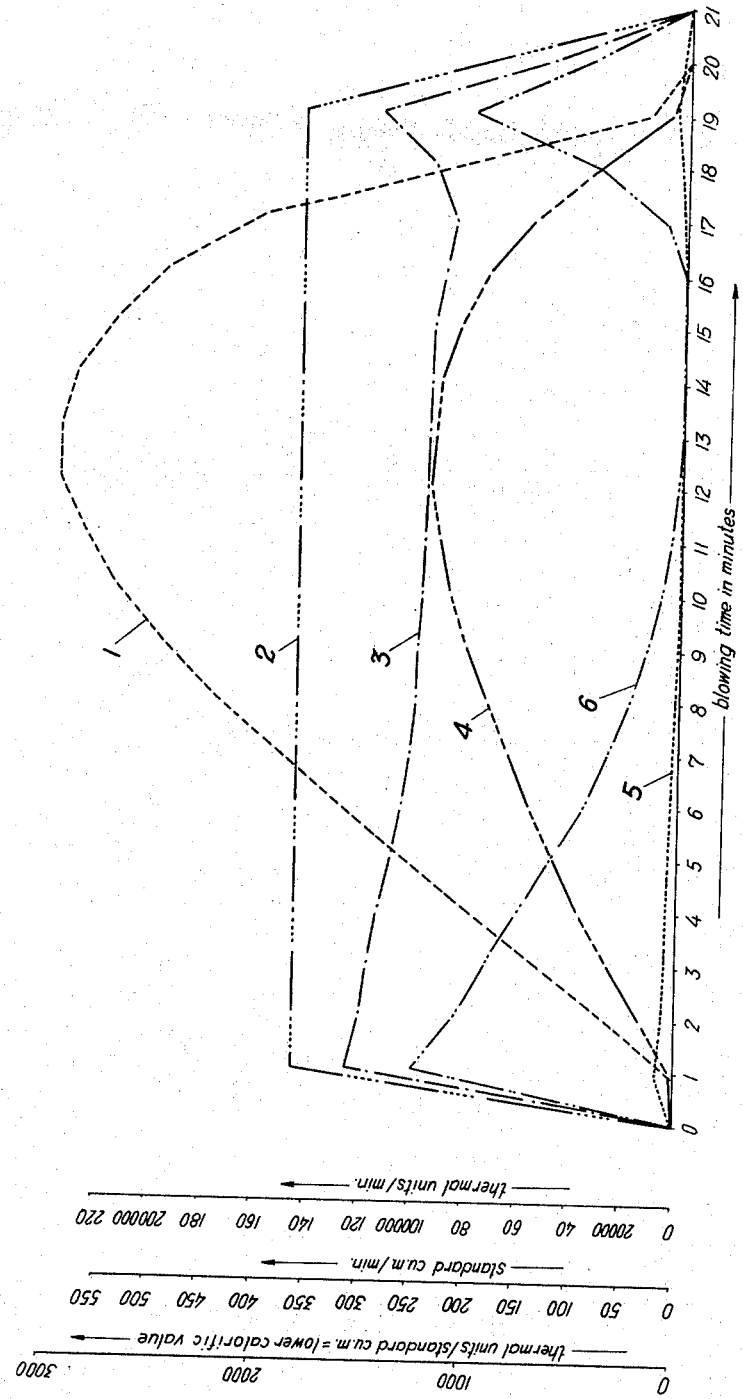

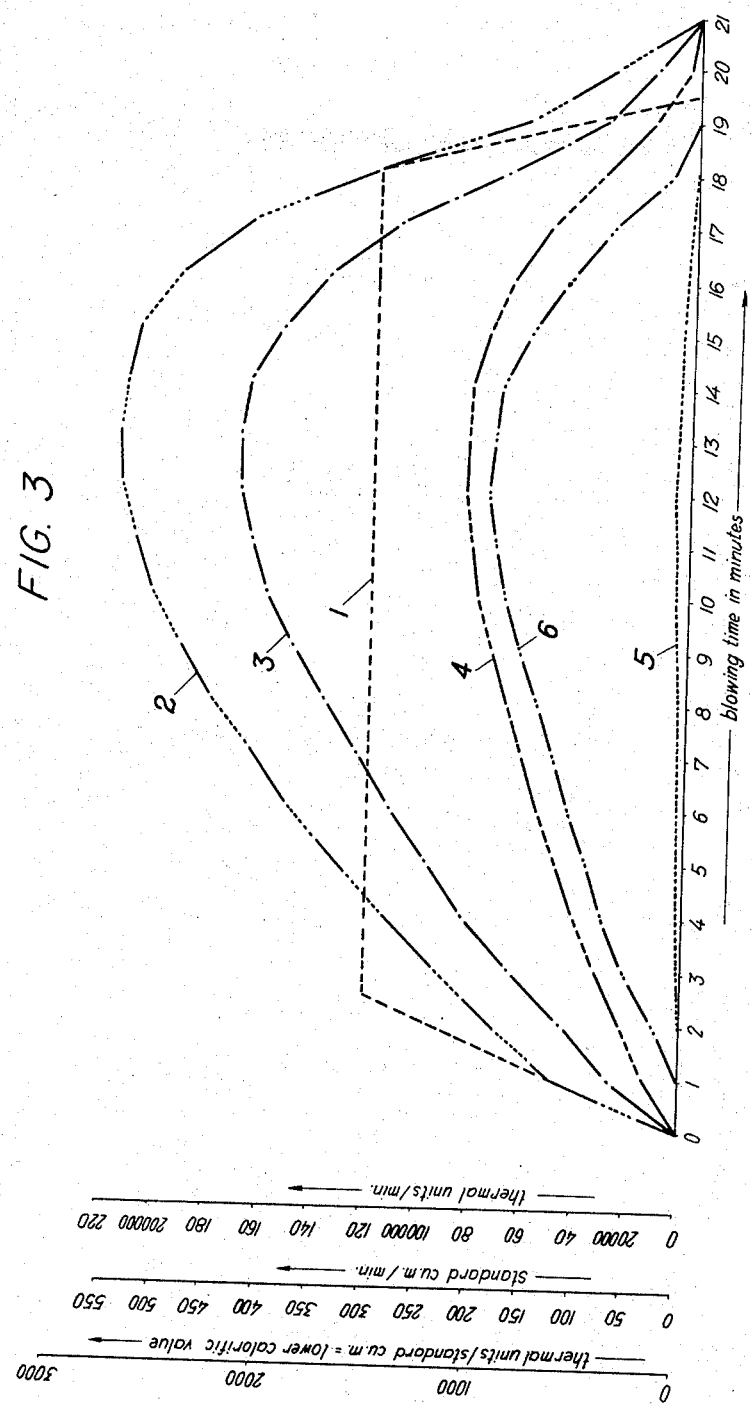

3,341,324
METHOD FOR THE RECOVERY OF A COMBUSTIBLE GAS DURING REFINING PIG IRON
Karl Rieder, Linz, Austria, assignor to Firma Vereinigte Österreichische Eisen- und Stahlwerke Aktiengesellschaft, Linz, Austria, a company of Austria
Filed Dec. 18, 1964, Ser. No. 419,490
Claims priority, application Austria, Dec. 23, 1963, A 10,377/63
5 Claims. (Cl. 75—60)

This invention relates to a method for the recovery of a combustible gas during refining pig iron by means of oxygen which is blown onto the pig iron bath from above.

Various proposals have already been known for utilizing the sensible heat of converter waste gases, on the one hand, and the heat of combustion of the carbon oxide contained in the waste gases, on the other hand. To this end, it has previously been proposed by the applicant to add oxygen in the form of infiltrated air to the waste gases escaping from the converter mouth, the air being stoichiometrically proportioned so as to provide for a complete combustion of the carbon oxide. The mixture of waste gases and combustion gases was passed through a chimney including a boiler system and then through a dust removing plant and exhausted into the open.

According to a very old proposal dating back to 1909 (German patent specification No. 216,302) it has been known, on the other hand, to recover from the waste gases from the converter a combustible gas by preventing the access of air and a combustion of the carbon oxide contained in the converter gases by a water-cooled hood placed on the mouth of the converter. The converter gases are trapped only during the carbon combustion period so that such waste gases poor in CO as are produced during the desiliconization period and during the dephosphorization period will not reduce the calorific value of the gas to be trapped.

Based on the mentioned principle, further proposals have become known in recent times. According to Austrian Patent No. 205,527, for instance, a combustible gas is recovered during the period of carbon combustion. Cold nitrogen or an other cold, non-oxidizing gas is blown into the cooled hood arranged on the converter mouth in order to reduce the temperature of the converter waste gases and to avoid damage to the pipe lines. A modification of this proposal is disclosed in patent of addition No. 229,347, which relates to substantially the same method, with the qualification that the waste gases are trapped and stored only when they have a certain minimum content of carbon oxide of, e.g. 25%. The first and last runnings are exhausted into the open.

Further proposals which have become known from French YAWATA patents and from "Fume Arrestment," published by Iron and Steel Institute 1963, relate to the recovery of combustible gases from converter waste gases evolved in top blowing processes, the method comprising flushing with nitrogen before the trapping period and introducing nitrogen into the exhausting system also after the trapping period, to the control of the pressure in the exhausting system or to the adjustment of a certain pressure difference between inside pressure and outside pressure, to sealing the gap between the converter mouth and the hood, and to other details.

As is apparent from the above presentation of the prior art, two entirely different ways of utilizing the energy content of the waste gases have been attempted. One way resides in joining the converter with the waste heat boiler, burning the carbon oxide contained in the converter waste gases, and utilizing the total of sensible heat and heat of combustion of the waste gases. The second way is the recovery of waste gases without combustion where the converter does not cooperate with a waste heat boiler, the waste gases merely being cooled, the first and last runnings discarded and only the waste gases evolved during the carbon combustion and having a high CO content being trapped upon having been passed through washers, purifyers etc.

Both of two ways hitherto attempted have certain disadvantages. The disadvantage of the first method is seen in the fact that the escaping waste gases having a temperature of 1600 to 1800° C. are increased in temperature due to the combustion heat, for which reason the installations in the lower part of the chimney have to be made of a highly refractory and wear-resistant material. The amount of heat accumulating in the waste heat boiler and, accordingly, the steam output are increased and decreased by bounds in the same rate as carbon oxide is produced, and it is a known fact that, e.g., between the 6th and 12th minutes the amount of heat obtained is doubled and from the 13th to the 18th minute is reduced by half. On the other hand, the advantage of the first method is obvious, namely, a high operational safety, explosions being eliminated.

The disadvantage of the second method may be seen in that the sensible (physical) heat of the hot waste gases is not or not sufficiently utilized, that complicated control means are required to exclude the air, and that also in such periods in which there is no trapping a certain minimum amount of inert gas has to be circulated through the exhausting system so as to keep the control means in operation.

The present invention has as its object to avoid the disadvantages of the known systems and to combine their advantages. This task is solved, according to the invention, in that a crucible or converter for carrying out a top-blowing process is joined with a chimney including a waste heat boiler system and with a subsequent exhausting system and that after the beginning of the carbon combustion there is added to the waste gases a slightly oxidizing gas having an oxygen content which is lower than that of air, preferably an oxygen content of 5 to 12%.

By the procedure according to the invention the heat utilized by the waste heat boiler is increased by the heat of reaction generated by the partial combustion of the carbon oxide with the slightly oxidizing gas, as compared to the sensible heat of the waste gases. The total of sensible heat and heat of reaction does not range at such high values as in the known processes which are mentioned in the introductory part of the specification in connection with the first method, as in the known processes the entire carbon oxide was burnt.

In the method according to the invention the risk of over-heating of the lower part of the chimney and its auxiliary devices thus does not exist in the same measure as previously, and in addition the advantage inherent to the second group of known processes, viz: the possibility to trap and store a gas still having a calorific value is obtained. Since, as is easily understood, the ignition temperature is exceeded at any time in which there is gas in the chimney, and the carbon oxide fully reacts with the oxygen in the addition gas, the risk of explosions is substantially eliminated. The method according to the invention thus does, in fact, utilize the advantages of both of the groups of known processes, while avoiding the disadvantages thereof.

According to preferred embodiments of the invention the amount and composition of the slightly oxidizing gas to be added to the waste gases may be controlled. If it is desired to maintain the steam production constant during the major part of the refining process, i.e. to avoid a sudden load on the waste heat boiler during the period of maximum carbon oxide evolution, the quantitative control may be effected in such manner that the amount of the addition gas is continuously decreased, starting at the beginning of the carbon combustion—for instance, from the 2nd to the 12th minute—and subsequently, e.g. from the 16th to the 19th minute, increased again. If, on the other hand, it is desired to trap a flue gas having a constant calorific value during the major period of the refining process, the control is effected in such manner that the amount of the addition gas is continuously increased in the first phase, e.g. from the 1st to the 12th minute, and continuously reduced again in the second phase, e.g. from the 14th to the 19th minute.

Also the oxygen content of the slightly oxidizing gas to be added to the waste gases may be controlled according to the invention in order to achieve a constant steam output during a part or the whole duration of the refining process, on the one hand, or to obtain a pre-determined calorific value of the gas to be trapped during a part or the whole duration of the refining process, on the other hand. Quantitative control and the control of the oxygen content may be effected simultaneously.

Various embodiments and details of the method according to the invention are diagrammatically illustrated in the accompanying drawings, in which FIGURE 1 is a graph illustrating a mode of operation in which a constant amount of the slightly oxidizing gas having a constant content of oxygen is added to the converter waste gases. In FIGURE 1 the total amount and the CO content of the waste gas, its calorific value and the amount of heat supplied to the boiler system are shown in dependence on time. Also the composition of the addition gas is apparent from the figure. FIGURE 2 is a graph illustrating a mode of operation in which the amount of the slightly oxidizing gas is not kept constant, whereas the oxygen content is constant. Also in this figure the amounts, the calorific value and the heat supplied to the boiler system are plotted in the same manner as in FIGURE 1. The curves plotted in FIGURE 2 are based on the assumption that the steam production remains constant over a certain period of the refining process. FIGURE 3 is a graph illustrating a mode of operation in which non-constant amounts of the slightly oxidizing gas having an approximately constant oxygen content are added. The curves plotted in this graph are based on the assumption that the calorific value of the gas to be trapped is maintained constant for a certain period of the refining process, whereas steam production is not constant in this case. The amount, the calorific value and the heat supplied to the boiler system are plotted in the same manner as in FIGURE 1.

In particular, the following characteristics of the method may be gathered from the accompanying diagrams:

When carrying out a top blowing process in a 50 ton crucible, using a charge consisting of steel-making pig iron, the refining period is 21 minutes. The blowing time in minutes is plotted on the abscissa. The ordinate in the graph shown in FIGURE 1 includes four scales, viz: the temperature of the waste gas, the amount of heat supplied to the boiler system in thermal units (Kcal.) per minute, the amount of the gases added and recovered, respectively, per unit of time in standard cubic metres per minute, and the calorific value of the trapped gas in thermal units (Kcal.) per standard cubic metre.

Curve 1 demonstrates the calorific value of the flue gas, curve 2 the amount of heat supplied to the boiler system; curve 3 illustrates the amount of waste gas and curve 4 the respective proportion of carbon oxide in standard cubic metres per minute. Curves 5 and 6 illustrate the amounts of oxygen and nitrogen added. These amounts are constant. The oxygen content of the addition gas is 6%. Numeral 7 denotes the temperature curve. As is shown, neither the calorific value of the waste gas nor the amount of heat supplied to the boiler are constant in this mode of operation, but the graphs demonstrate first a rising and then a falling trend.

In the embodiment according to FIGURE 2, again a gas is added which has a constant content of 6% oxygen. The designation of the curves is the same as in FIGURE 1. In this embodiment the amount of the addition gas is large at the beginning, i.e. at the end of the 1st minute, and towards the end of the refining process, i.e., at the end of the 19th minute. From the 1st to the 13th minute the amount of addition gas continuously decreases, and from the 16th to the 19th minute continuously increases again. Between the 13th and the 16th minute no addition gas is added. Under these conditions a constant amount of heat of 145,000 Kcal./min. is supplied to the boiler from the 1st to the 19th minute. The calorific value of the flue gas is not constant. It rises from the 1st to the 12th minute to about 2900 Kcal./standard cubic metre and continuously decreases again from the 14th minute on.

FIGURE 3, in which curves of like significance are again designated by like reference numerals, illustrates a mode of operation in which the amount of addition gas, which has an approximately constant content of 6% oxygen, is varied in such manner that the calorific value of the trapped gas remains constant from the 2nd to the 18th minute, namely at a value of 1500 Kcal./standard cubic metre, whereas the amount of heat supplied to the boiler system fluctuates. This amount of heat which is used for producing steam reaches a value of 120,000 Kcal./min. only between the 4th and 5th minutes, then rises to about 220,000 Kcal./min. during the 12th to 13th minutes, and then declines rapidly. As has been mentioned, the data given above apply to a 50 ton crucible. They are, of course, dependent on the capacity of the crucible or converter used and on the duration of the blowing period, respectively.

It is, of course, within the scope of the invention to modify the extreme cases illustrated in the drawings and also to control the oxygen content of the addition gas, either to control the steam output or to adjust a pre-determined calorific value of the gas trapped.

What I claim is:

1. In a method for the recovery of a combustible gas during a process of refining pig iron including blowing oxygen from above onto a pig iron bath in a converter, wherein the waste gases evolved during the combustion of carbon and having a content of carbon oxide varying in dependence on the progress of the refining process, after having escaped from the converter, are passed through a chimney including a boiler system to utilize their sensible heat and stored after their exit from the chimney, the step comprising adding a slightly oxidizing gas having a substantially constant percentage of oxygen content which is lower than that of air to said waste gases after the beginning of the combustion of carbon.

2. The method set forth in claim 1, wherein the slightly oxidizing gas has an oxygen content of 5 to 12%.

3. In a method for the recovery of a combustible gas during a process of refining pig iron including blowing oxygen from above onto a pig iron bath in a converter, wherein the waste gases evolved during the combustion of carbon and having a content of carbon oxide varying in dependence on the progress of the refining process, after having escaped from the converter, are passed through a chimney including a boiler system to utilize their sensible heat and stored after their exit from the chimney, the step comprising adding a slightly oxidizing gas having a substantially constant percentage of oxygen content which is lower than that of air to said waste gases after the beginning of the combustion of carbon, the amount of gas added being so controlled that it is continuously decreased at the beginning of the refining process and then increased again, in order to achieve a constant steam production during the major period of the refining process.

4. The method set forth in claim 3, wherein the amount of gas added is continuously decreased from the 1st to the 13th minute and continuously increased again from the 16th to the 19th minute, when said refining process is carried out in a converter having a capacity of about 50 tons.

5. In a method for the recovery of a combustible gas during a process of refining pig iron including blowing oxygen from above onto a pig iron bath in a converter having a capacity of about 50 tons, wherein the waste gases evolved during the combustion of carbon and having a content of carbon oxide varying in dependence on the progress of the refining process, after having escaped from the converter, are passed through a chimney including a boiler system to utilize their sensible heat and stored after their exit from the chimney, the step comprising adding a slightly oxidizing gas having an oxygen content which is lower than that of air to said waste gases after the beginning of the carbon combustion, the amount of gas added being so controlled that it is continuously increased from the 1st to the 12th minute and continuously decreased again from the 14th to the 19th minute, to produce a gas having a constant calorific value during the major period of the refining process.

References Cited
UNITED STATES PATENTS

| | | | |
|---|---|---|---|
| 2,831,467 | 4/1958 | Guczky | 75—60 |
| 3,118,759 | 1/1964 | Okaniwa et al. | 75—60 |
| 3,190,747 | 6/1965 | Namy et al. | 75—60 |
| 3,220,826 | 11/1965 | Okaniwa et al. | 75—60 |

BENJAMIN HENKIN, *Primary Examiner.*

DAVID L. RECK, *Examiner.*